United States Patent
Kumon et al.

(10) Patent No.: US 8,116,937 B2
(45) Date of Patent: Feb. 14, 2012

(54) VEHICLE DISPLAY APPARATUS

(75) Inventors: Hitoshi Kumon, Aichi-gun (JP); Satoru Ishizaki, Tajimi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 567 days.

(21) Appl. No.: 12/227,829

(22) PCT Filed: Jun. 1, 2007

(86) PCT No.: PCT/IB2007/001441
§ 371 (c)(1),
(2), (4) Date: Nov. 28, 2008

(87) PCT Pub. No.: WO2007/141614
PCT Pub. Date: Dec. 13, 2007

(65) Prior Publication Data
US 2009/0132130 A1    May 21, 2009

(30) Foreign Application Priority Data
Jun. 6, 2006    (JP) ................... 2006-157671

(51) Int. Cl.
*B60K 35/00* (2006.01)
*B60K 37/06* (2006.01)
*G06F 3/041* (2006.01)
(52) U.S. Cl. ...................... 701/36; 340/425.5
(58) Field of Classification Search .......... None
See application file for complete search history.

(56) References Cited

U.S. PATENT DOCUMENTS

| | | | |
|---|---|---|---|
| 7,957,864 B2 * | 6/2011 | Lenneman et al. | 701/36 |
| 2002/0067366 A1 * | 6/2002 | Hirao et al. | 345/660 |
| 2004/0140959 A1 | 7/2004 | Matsumura et al. | |

FOREIGN PATENT DOCUMENTS

| | | |
|---|---|---|
| GB | 2 418 188 A | 3/2006 |
| JP | A-63-313188 | 12/1988 |
| JP | A-09-115377 | 5/1997 |
| JP | A-10-269022 | 10/1998 |
| JP | A-2002-046553 | 2/2002 |
| JP | 2002-225724 * | 8/2002 |
| JP | A-2004-126354 | 4/2004 |
| JP | A-2004-145821 | 5/2004 |
| JP | A-2005-017968 | 1/2005 |
| KR | 2000-0062255 | 10/2000 |
| WO | WO 2006/043721 A1 | 4/2006 |

OTHER PUBLICATIONS

Office Action issued in Korean Patent Application No. 10-2008-7029657, on Oct. 12, 2010 (with translation).

* cited by examiner

*Primary Examiner* — Michael J. Zanelli
(74) *Attorney, Agent, or Firm* — Oliff & Berridge, PLC

(57) ABSTRACT

A vehicle display apparatus includes an image display device (30) disposed in a region where an operator is unable to operate the display apparatus (30), and a transparent display input device (100) installed in a region from a surface portion of the instrument panel (40) to an upper portion of a center console (50). The vehicle display apparatus is designed to allow the operator to operate the image display device (30) from a remote position by manipulating the transparent display apparatus (100) disposed near the operator.

9 Claims, 14 Drawing Sheets

OPERATE TOUCH PANEL

TRANSPARENT OVERLAP SYSTEM

FIG. 4A
FIG. 4B
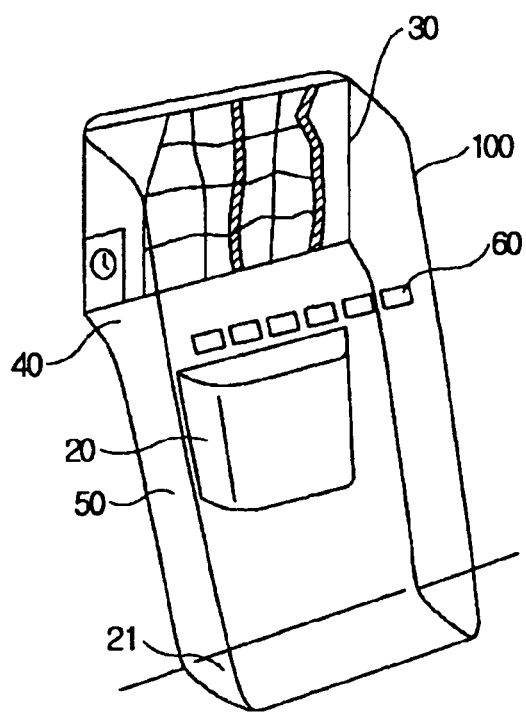
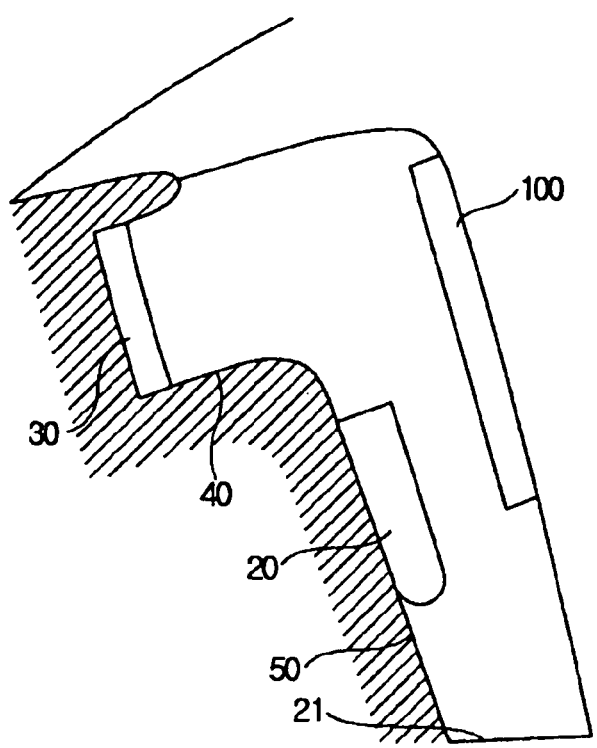

VEHICLE DISPLAY APPARATUS

BACKGROUND OF THE INVENTION

1. Field of the Invention

The present invention relates to a vehicle display apparatus that allows remote operation of an image display device by operating a transparent display input device near the operator, wherein the image display device is mounted at a distance from an operator of a vehicle, such that the operator cannot manipulate the image display device.

2. Description of the Related Art

In many occasions, vehicles are equipped with a vehicle display apparatus with an image display device provided with functions of displaying maps of geographical regions and navigating a target geographical region. Operational switches of a touch panel are displayed on a display screen of the image display device, and an operator usually manipulates the image display device by touching the operational switches.

However, if the operational switches are displayed on the same display portion of the image display device that represents geographical maps, the image display device needs to be installed within the reach of the hand of a driver or operator. Thus, the image display device is typically installed somewhere close to the driver or operator. For this reason, when the driver views the screen displaying important information such as geographical information, the driver usually has to refocus from a remote frontal site for driving to the screen of the image display device. As a result, the driver often feels inconvenient to see the display screen.

In order to solve the above inconvenience problem, a transparent display input device is installed on the surface of the instrument panel to allow the display of the transparent display to be operated as a touch panel, and the image display device is installed deep inside the instrument panel to improve visibility even from a remote place by seeing a displayed image through the transparent display input device. For instance, Japanese Patent Application Publication No. 2004-126354 (JP-A-2004-126354) describes such a vehicle display apparatus.

However, in the above configuration described in the JP-A-2004-126354, because the image display device and the transparent display input device are integrated together and equipped within the instrument panel, the transparent display input device on the surface of the instrument panel may be away from an operator to further improve visibility of the image display device. As a result, manipulability/operability of the transparent display input device may be also degraded. Furthermore, due to the integral structure attached to the instrument panel, a region between the image display device and the transparent display input device may not be used as an available space.

SUMMARY OF THE INVENTION

The present invention provides a vehicle display apparatus that allows the operator to operate the image display device installed around an instrument panel with good visibility, from a remote position where the operator cannot operate the image display device, by manipulating a transparent display input device installed nearer to the operator than to the instrument panel. The vehicle display apparatus can also provide an available space at the rear side of the transparent display input device.

A vehicle display apparatus in accordance with a first aspect of the invention includes: a display device disposed in an instrument panel; and a transparent display input device for the display device, the transparent display input device extending substantially from a surface portion of the instrument panel to an upper portion of a center console. Hence, manipulability and operability of the display apparatus is improved as an operator is allowed to manipulate the transparent display input device disposed closer to the operator than to the display device.

A second aspect of the invention is directed to the vehicle display apparatus of the first aspect, wherein the display device is disposed at a rear portion of the transparent display input device and viewed by an operator through the transparent display input device.

A third aspect of the invention is directed to the vehicle display apparatus of the first or the second aspect, wherein the vehicle display apparatus includes a container or a storage space disposed in between a surface portion of the instrument panel and the rear portion of the transparent display input device or between a surface portion of the center console and the rear portion of the transparent display input device. As a result, the space at the rear side of the transparent display input device can be used effectively for other purpose.

A fourth aspect of the invention is directed to the vehicle display apparatus of any one of the first to the third aspects, wherein the space between the surface portion of the instrument panel and the rear portion of the transparent display input device or between the surface portion of the center console and the rear portion of the transparent display input device is open on the right and left sides. Consequently, it is easy to access the container or the storage space, and spaciousness can be created inside the vehicle due to the transparent display input device.

A fifth aspect of the invention is directed to the vehicle display apparatus of any one of the first to the fourth aspects, wherein the transparent display input device includes at least one of a rotary switch and a slide switch disposed on a surface of the transparent display input device, wherein the rotary switch and the slide switch are used for multiple functions, and wherein scales of the rotary switch or the slide switch are displayed differently based on each of the multiple functions. Thus, many more functions can be performed with the minimum number of the rotary switches or the slide switches.

A vehicle display device in accordance with a sixth aspect of the invention includes: a display device disposed before an operator to be viewable by the operator; a transparent display input device disposed in a region operable by the operator between the display device and the operator to allow operation of the display device; and a moving device to move one of the transparent display input device and an image displayed on the transparent display input device to a given direction for substantially reducing operator's parallax. Due to this configuration, parallax that often occurs when the image display device and the transparent display input device are apart from each other by a certain distance and the operator obliquely views an image, can be effectively corrected. As a result of this effect, manipulability and operability of the vehicle display apparatus can be improved.

A seventh aspect of the invention is directed to the vehicle display apparatus of the sixth aspect, wherein the moving device includes at least one of a sliding device for a straight movement and a rotating device for a circular movement to move the transparent display input device to the up and down or the left and right directions.

An eighth aspect of the invention is directed to the vehicle display apparatus of the sixth or the seventh aspect, wherein the vehicle display device includes a detection device to detect one of a driver and a passenger as an operator and wherein the moving means moves one of the transparent display input device and the image displayed on the transparent display apparatus to the detected operator according to the detection result. Hence, the parallax for a displayed image can be automatically corrected to thereby improve manipulability and operability of the vehicle display apparatus.

A ninth aspect of the invention is directed to the vehicle display apparatus of any one of the sixth to the eighth aspects, wherein the vehicle display apparatus includes a calculating device to calculate the distance that one of the transparent display input device and the image displayed on the transparent display input device moves to the vertical or horizontal directions. Accordingly, the operator can see a displayed image with appropriate correction to the parallax, and this effect allows improving manipulability and operability of the display apparatus to a great extent.

A tenth aspect of the invention is directed to the vehicle display apparatus of any one of the first to the ninth aspects, wherein the vehicle display includes a sensor disposed near the transparent display input device that senses the approach of the operator; and a display control device for controlling the transparent display device to display various functions on the transparent display input apparatus only when the approach of the operator is sensed.

A eleventh aspect of the invention is directed to the vehicle display apparatus of the tenth aspects, wherein, when the operator does not operate the transparent display input device, the display control device controls the transparent display input device to display additional or detailed information related to a predetermined image displayed on the image display apparatus on a given region of the transparent display input device.

A twelfth aspect of the invention is directed to the vehicle display apparatus of any one of the first to the eleventh aspects, wherein the vehicle display includes a lighting device for lighting the display panel of the transparent display input device.

BRIEF DESCRIPTION OF THE DRAWINGS

The above and other objects and features of the present invention will become apparent from the following description of preferred embodiment, given in conjunction with the accompanying drawings, in which:

FIGS. 3A, 3B and 3C are explanatory diagrams demonstrating detailed installation positions of a conventional vehicle display apparatus and a transparent display input device of a vehicle display apparatus employing a transparent overlapping system in accordance with the embodiment of the present invention, wherein FIG. 3A illustrates the conventional configuration of a vehicle display apparatus using the transparent overlapping system; FIG. 3B illustrates one example of a vehicle display apparatus in accordance with the first embodiment of the present invention; and FIG. 3C is an overlapped view depicting the difference between the vehicle display apparatus using the conventional transparent overlapping system illustrated shown in FIG. 3A and the vehicle display apparatus employing the transparent overlap method in accordance with the first embodiment of the present invention shown in FIG. 3B;

FIGS. 4A and 4B are schematic diagrams depicting a vehicle display apparatus including a container or a storage space in accordance with the embodiment of the present invention;

FIGS. 8A and 8B are explanatory diagrams describing the basic concept employed in a vehicle display apparatus in accordance with a second embodiment of the present invention, wherein FIG. 8A illustrates a parallax caused by a positional relationship of operator's eyes, a displayed image of an image display device and an overlap display part of a transparent display input device 100; and FIG. 8B illustrates the case of moving the overlap display part by a distance of L to curtail the error caused by the parallax;

FIGS. 10A and 10B are schematic diagrams demonstrating a vehicle display apparatus in accordance with the second embodiment of the present invention, wherein the movement for correcting the parallax is obtained by shifting the displayed image of a transparent display input device to the left or right side, wherein FIG. 10A illustrates the vehicle display apparatus before correcting a parallax; and FIG. 10B illustrates the vehicle display apparatus after correcting the parallax;

FIGS. 13A and 13B are schematic diagrams of a vehicle display apparatus having a transparent display input device provided with a rotating device in accordance with the embodiment of the present invention, wherein FIG. 13A is a perspective view demonstrating the rotating device; and FIG. 13B is a top view illustrating a positional relationship between elements of the vehicle display apparatus employing the rotating device; and FIGS. 14A, 14B and 14C illustrate a vehicle display apparatus in accordance with the second embodiment of the invention, wherein a moving distance of a transparent display input device is automatically calculated and then the transparent display input device is moved, and wherein FIG. 14A is a perspective view of the vehicle display apparatus; FIG. 14B is a top view of the vehicle display apparatus; and FIG. 14C illustrates a top view of the display apparatus having a rotating device and a television camera.

DETAILED DESCRIPTION OF THE PREFERRED EMBODIMENTS

Various embodiments of the present invention will now be described in detail with reference to the accompanying drawings.

Figure 1:
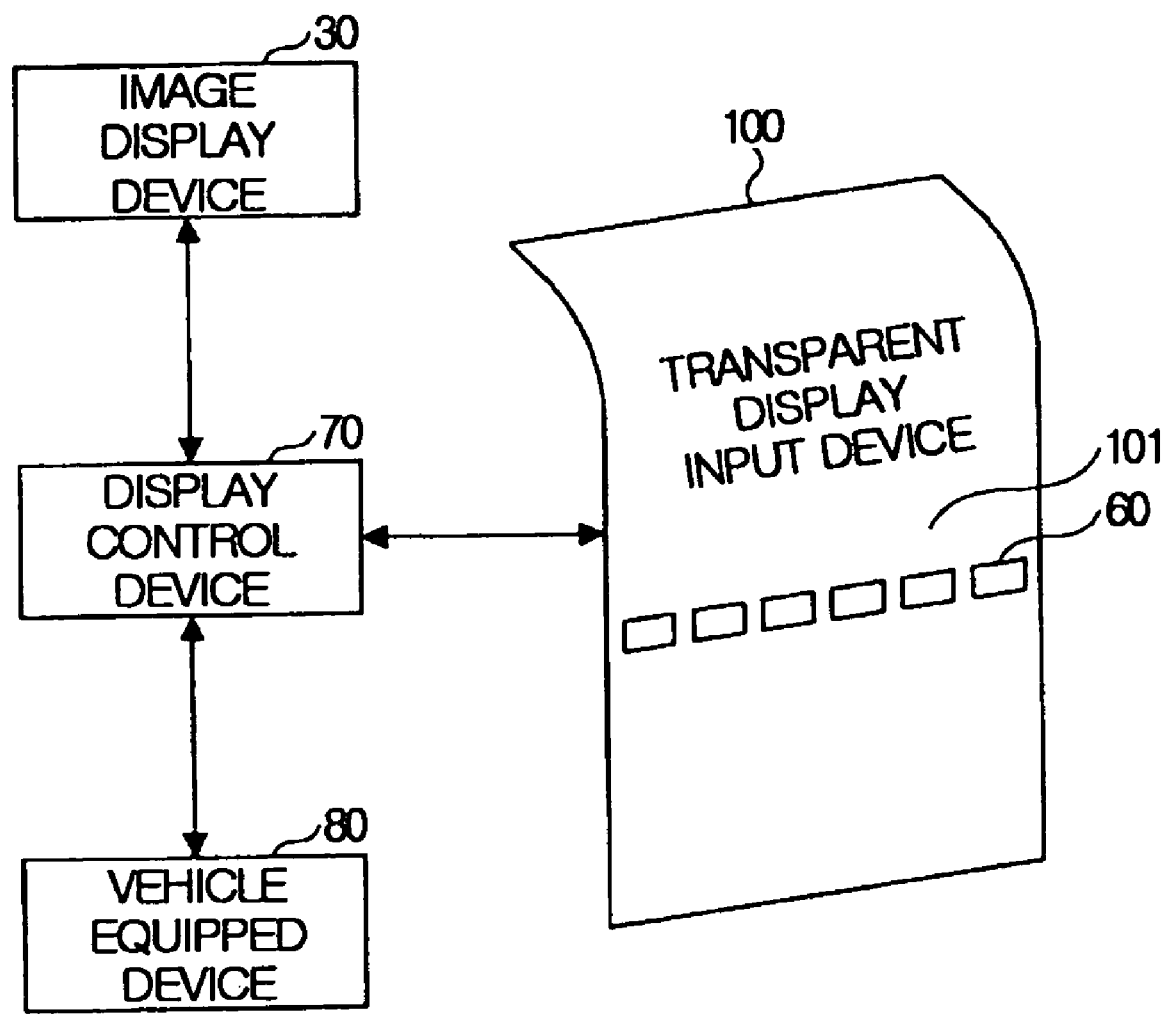
FIG. 1 is a functional block diagram showing a vehicle display apparatus and related devices in accordance with a first embodiment of the present invention.

FIG. 1 illustrates a functional block diagram of one example of main configuration of a vehicle display apparatus and related devices in accordance with a first embodiment of the present invention. As shown in FIG. 1, the vehicle display apparatus includes a transparent display input device 100, a display control device 70, and an image display device 30 displaying information images, such as maps. The vehicle display apparatus also includes a vehicle-equipped device 80 as a related device, performing predetermined functions, such as an air-conditioning function, an audio function, and a navigation function. The transparent display input device 100 may display input switches 60 on a display panel 101.

The display control device 70 is configured with a micro computer as a key element. That is, the display control device 70 includes: a central processing unit (CPU) that performs various processes according to given operating programs; a memory that stores the operating programs of the CPU, image data, arithmetic operation results, e.g., read-only memory (ROM), random-access memory (RAM), and electrically erasable programmable read-only memory (EEPROM); a timer; a counter; and an input/output (I/O) interface. A data bus couples the CPU, the memory, and the I/O interface to each other. Programs executed by the CPU implement the various operations and functions of the display control device 70 as described below.

The display control device 70 communicates with the transparent display input device 100. The display control device 70 receives signals from the various input switches 60 of the transparent display input device 100. Then, the display control device 70 changes the display screen of the image display device 30, i.e., generating various operation menu images, and at the same time, sends signals corresponding to the signals from the various input switches 60 to another electric control unit (ECU), e.g., car navigation ECU, audio ECU, and air-conditioning ECU. Another ECU controls the vehicle-equipped device 80, e.g., navigation system, audio, and air-conditioning, to performing functions corresponding to the signals from the various input switches 60 in response to the signals sent from the display control device 70.

The display control device 70 communicates with the image display device 30. The image display device 30 is generally referred to as a main display. In this embodiment, the image display device 30 includes a thin film transistor-liquid crystal display (TFT-LCD).

Figure 2A:
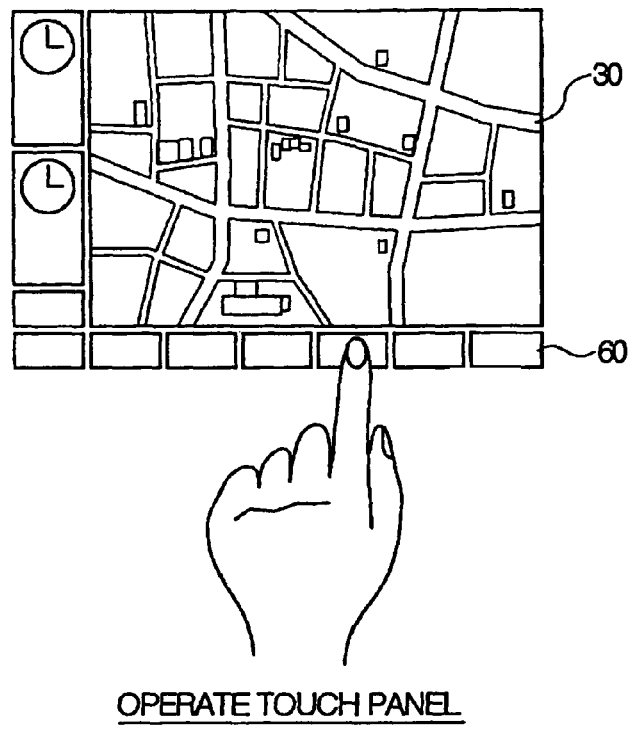
FIGS. 2A and 2B are schematic diagrams illustrating overall configurations of a vehicle display apparatus using a conventional touch panel operation system and a vehicle display apparatus employing a transparent overlapping system in accordance with the embodiment of the present invention.
Figure 2B:
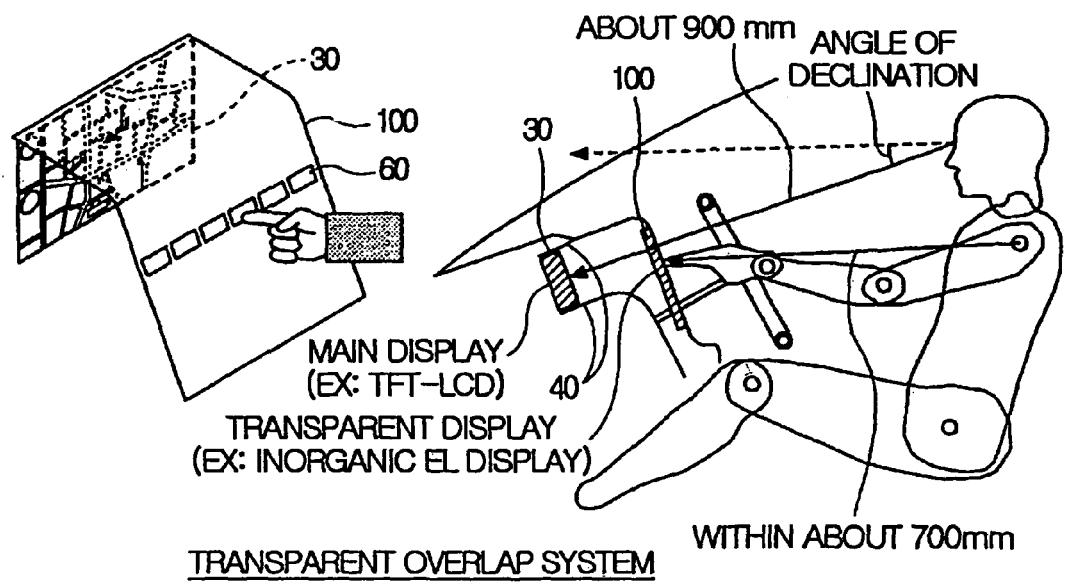

FIGS. 2A and 2B illustrate a schematic diagram illustrating overall configurations of a vehicle display apparatus using a conventional touch panel operation system and a vehicle display apparatus employing the transparent overlap system in accordance with the embodiment of the present invention. FIG. 2A illustrates a vehicle display apparatus using a conventional touch panel operation system. An image display device 30 displays images such as maps and also displays input switches 60 on the same screen. Thus, the image display device 30 should be installed in a manner that the input switches 60 are within the reach of the hands of an operator. Also, the image information such as maps, at a relatively close position to the operator, should be sighted by the operator.

FIG. 2B illustrates a vehicle display apparatus employing a transparent overlap system in accordance with an embodiment of the present invention. The image display device 30 is disposed deep inside of an instrument panel 40, far from the operator. At the position, the operator may not be able to access the image display device 30 while seated, without moving. Drivers generally gaze far ahead in order to promptly grasp the traffic situations and predict possible traffic changes while driving. Therefore, image information such as maps should be also disposed in front and as far away as possible from the driver to reduce the shifting the field of view. Consequently, a burden of looking at the image information may be reduced, contributing to safe driving. In this point of view, the image display device 30 is disposed in front and far away from the driver in the vehicle display apparatus in accordance with this embodiment. The location of the image display device 30 can be as far away as possible from the eyes of the driver. Also, the image display device 30 can be installed as high up as possible to the extent where the image display device 30 does not interfere with driving. In more detail, when represented by using an angle of declination from the horizontal line of the driver's gaze (hereinafter referred to as the angle of declination), the image display device 30 can be disposed at an upper position, for instance, more preferably, at an angle of declination of approximately 15°, in order to decrease the range of refocusing. When represented by using a distance from the eyes of the driver, the image display device 30 can be disposed at a front side of the vehicle within an available range of practical layout, for instance, more preferably, at a distance of approximately 900 mm or more from the eyes of the driver. Although types and forms of the image display device 30 are not limited as long as the image display device 30 displays satisfactory image information, a TFT-LCD can be preferably employed in the present embodiment.

Meanwhile, the transparent display input device 100 is installed within the reach of the driver while sitting in a driving position. Because the image display device 30 is installed out of the reach of the driver, a transparent display for displaying the input operation switches 60 is installed near the operator in order for the operator to operate them at a close position. The input switches 60 preferably include so-called touch switches. When the operator touches the input switches 60, a change of pressure or electric capacitance is detected and the input switches 60 are actuated. The display panel on which the input switches 60 are displayed is made transparent because the transparent display input device 100 is installed to cover the image display device 30. As a result, the operator can operate the input switches 60 while looking at image information such as maps displayed at the image display device 30 through the transparent display panel. Thus, the operator can input and operate the vehicle display apparatus in the same sense as the typical vehicle display apparatus using the touch panel operation system. That is, the vehicle display apparatus of the present embodiment effectively improves visibility of images such as maps while keeping the convenience of the typical touch panel operation system. The input switches 60 are positioned in a manner that the input switches 60 do not overlap with a display image of the image display device 30, such that, important information such as maps are not hidden by the input switches 60 when the operator views the image display device 30 through the transparent display input device 100. Also, the input switches 60 can be positioned near the corresponding display image such that the operator can recognize the display image and the input switches 60 within the same field of vision. For instance, as illustrated in FIG. 2A, the input switches 60 can be displayed side by side in a row at the bottom of a corresponding display image. As described above, the transparent display input device 100 is installed near the operator in an appropriate position for easy operation. The operator needs to view the input switches 60 while operating. However, when the input switches 60 are disposed too close to the operator, it becomes difficult to view the input switches 60. Thus, the transparent display input device 100 can be installed at a position where the operator can easily operate the input switches 60, having appropriate distance spacing from the operator that does not impose a burden on the viewing. For instance, the transparent display input device 100 can be installed to have a distance within, e.g., preferably approximately 600 mm to approximately 750 mm or more preferably 700 mm, from the shoulders of the operator. Although the transparent display input device 100 can include any type of material that can be appropriately used as a transparent display panel, a transparent self-luminescent type display such as an inorganic electro luminescence (EL) display panel is used in the present embodiment.

Figure 3A:
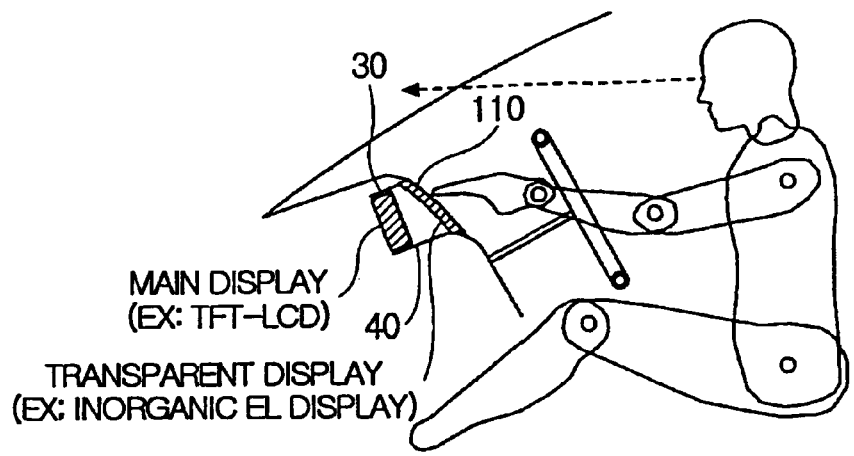
Figure 3B:
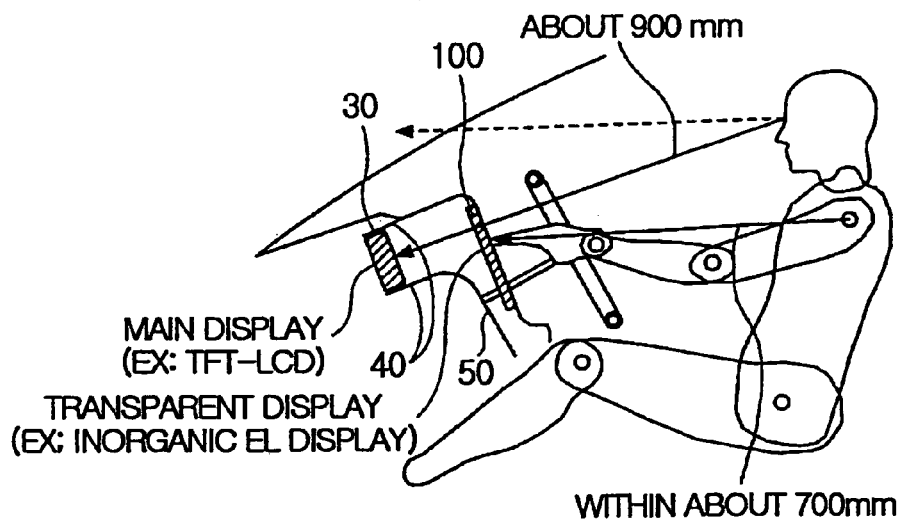

FIG. 3 is a explanatory diagram illustrating detailed installation positions of a conventional configuration and a transparent display input device 100 of a vehicle display apparatus employing a transparent overlap system in accordance with the embodiment of the present invention. FIG. 3A illustrates the conventional configuration of a vehicle display apparatus using the transparent overlap system. An image display device 30 is installed deep inside of an instrument panel 40, and a transparent type display input device 110 is installed in the surface of the instrument panel 40. Because the image display device 30 is installed in front and far away from an operator inside the instrument panel 40, the visibility is improved when compared to the touch panel operation system described in FIG. 2A. However, the transparent type display input device 110 is still installed far away from the operator since the transparent type display input device 110 is installed in the surface of the instrument panel 40. If the operator tries to operate the vehicle display apparatus using the displayed input switches 60 on the transparent type display input device 110 while sitting unmoved, the operator may not be able to reach the transparent type display input device 110. That is, the operator may not be able to reach the transparent type display input device 110 unless the operator leans forward. As shown in FIG. 3B, although the visibility may improved by installing the image display device 30 deep inside of the instrument panel 40, limitations arise in operations because the transparent type display input device 110 is still installed too far away from the operator.

Meanwhile, FIG. 3B illustrates an example of a vehicle display apparatus in accordance with the embodiment of the present invention. Unlike the vehicle display apparatus illustrated in FIG. 3A, a transparent display input device 100 is installed outside the instrument panel 40. A top portion of the transparent display input device 100 is disposed adjacent to an upper portion of the instrument panel 40. The transparent display input device 100 extends toward the operator, and the display surface of the transparent display input device 100, on which input switches 60 are displayed, is formed closer to the operator than the instrument panel 40. A bottom portion of the transparent display input device 100 is disposed adjacent to an upper portion of a center console 50. The top to bottom portions of the transparent display input device 100 extend over the upper portion of the instrument panel 40 to the upper portion of the center console 50. Also, the display surface that displays the input switches 60 are disposed towards the operator. By configuring the vehicle display apparatus as described above, the operator can operate the input switches 60 by simply reaching out his hand without changing the sitting position while driving, to thereby improve the operability of the vehicle display apparatus in an effective manner. The display surface of the transparent display input device 100 illustrated in FIG. 3B is disposed in parallel to a display surface of the image display device 30 and is also disposed approximately perpendicular to a gaze of the operator. Consequently, the visibility is improved in comparison to the transparent type display input device 110 illustrated in FIG. 3A, wherein the transparent type display input device 110 is formed along the surface of the instrument panel 40 and tilted with respect to the gaze of the operator and the image display device 30. For example, when a cross-shaped cursor is displayed on the surface of the transparent display input device 100 and a map is displayed on the display surface of the image display device 30 to indicate a destination, a parallax in vertical direction becomes large in the vehicle display apparatus having the configuration illustrated in FIG. 3A. However, in the vehicle display apparatus having the configuration illustrated in FIG. 3B, it is possible to form the transparent display input device 100 having the display surface approximately parallel to the image display device 30 and perpendicular to the gaze of the operator. Thus, the parallax is minimized. Configuring the transparent display input device 100 and the instrument panel 40 as one united form cannot avoid being controlled by the shape of the instrument panel 40. However, when the transparent display input device 100 is formed to extend over the upper portion of the instrument panel 40 to the upper portion of the center console 50, the vehicle display apparatus with improved visibility and operability can be effectively obtained. Even if the transparent display input device 100 functioning as an operation panel is installed near the operator, there exists a sufficient space behind the transparent display input device 100, which is a thin transparent panel. Thus, since spaciousness can be created inside the vehicle, an oppressed feeling will not be given to the operator.

Figure 3C:
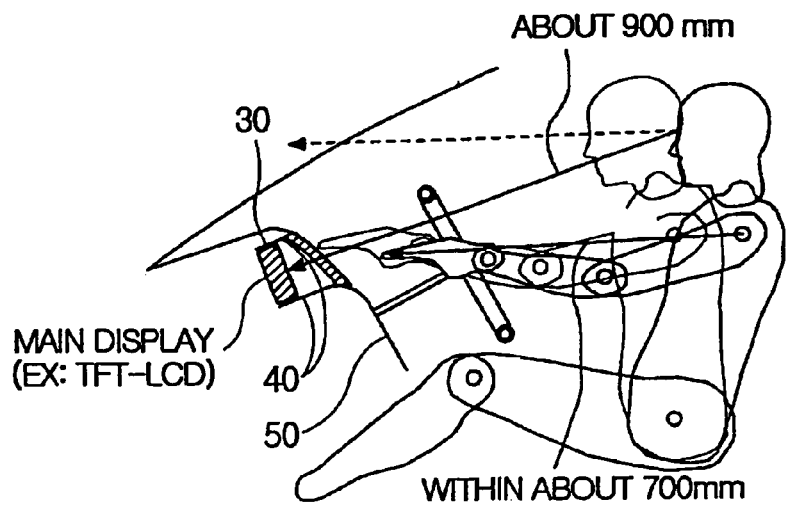

FIG. 3C illustrates an overlapped view of the vehicle display apparatus using the conventional transparent overlap system shown in FIG. 3A and the vehicle display apparatus employing the transparent overlap system in accordance with the embodiment of the present invention shown in FIG. 3B. The overlapped view is shown to describe distinct differences between the two vehicle display apparatuses. The vehicle display apparatus using the conventional transparent overlap system may require an operator to lean forward in order to operate the input switches 60. In contrast, the vehicle display apparatus of this embodiment allows the operator to operate the input switches 60 without changing the sitting position.

FIGS. 4A and 4B illustrate a vehicle display apparatus in accordance with one embodiment of the present invention, wherein the display apparatus further includes a container 20 or a storage space 21 installed in a space between the rear surface of a transparent display input device 100 and the surface of an instrument panel 40 or a center console 50. FIG. 4A is a perspective view and FIG. 4B is a cross-sectional view. In the vehicle display apparatus of this embodiment, the transparent display input device 100 employing a transparent display protrudes toward the operator to a great extent, extending over from the upper portion of the instrument panel 40 to an upper portion of the center console 50. Thus, a large space is generated between the rear surface of the transparent display input device 100 and the surface of the instrument panel 40 or the center console 50, and can be effectively utilized. Referring to FIGS. 4A and 4B, the container 20 is installed in the rear portion of the transparent display input device 100 and on the surface of the center console 50 below the instrument panel 40. Also, a flat surface of the upper portion of the center console 50 can be configured to be used as the storage space 21. Various information recording media such as CDs and MDs may be stored in the container 20, as well as various publications including newspapers, magazines, and travel guides, or small bags. Such small bags can also be stored in the storage space 21. Since the transparent display input device 100 is transparent, the operator can check conditions of the container 20 or the storage space 21 from the seat. Also, the space between the transparent display input device 100, the surface of the instrument panel 40, and the center console 50 is opened on right and left sides. Thus, the occupant has an easy access to the container 20 or the storage space 21.

Figure 5A:
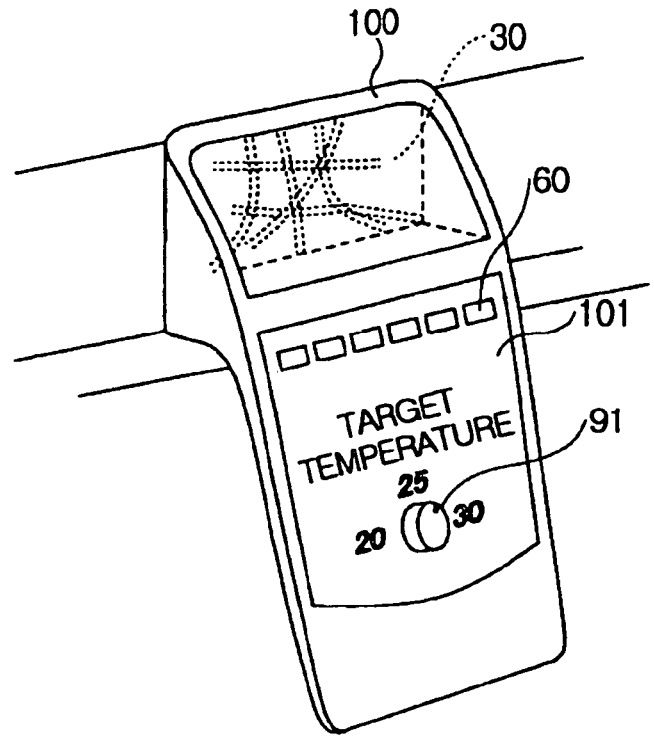
FIGS. 5A and 5B are schematic diagrams describing a vehicle display apparatus including a rotary switch installed in a display panel of a transparent display input device in accordance with the first embodiment of the present invention.
Figure 5B:
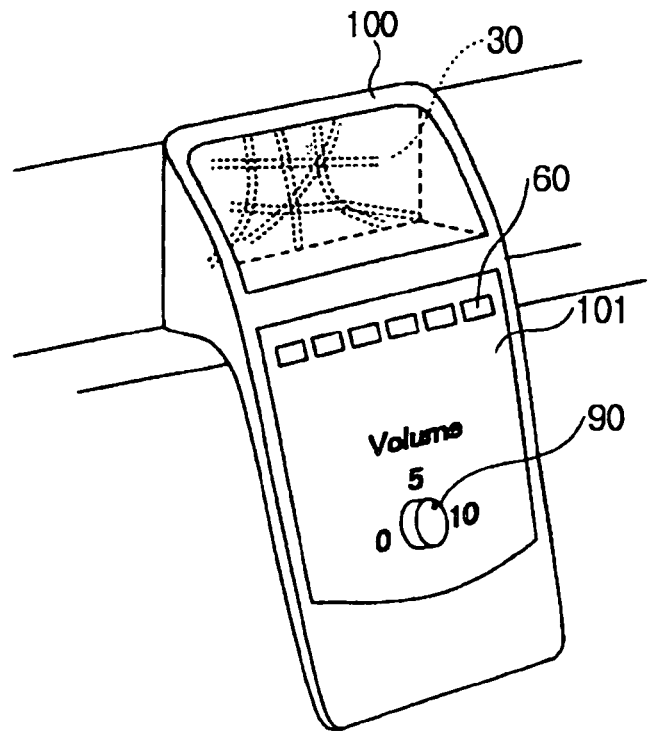

FIGS. 5A and 5B illustrate a vehicle display apparatus in accordance with one embodiment of the present invention, wherein the vehicle display apparatus includes a rotary switch 90 installed in a display panel 101 of a transparent display input device 100. The display panel 101 is a transparent type display panel and includes inorganic EL elements as described above. The rotary switch 90 is affixed and adhered on the corresponding display panel 101 by penetrating the display panel. By rotating the rotary switch 90, details and quantities represented by scales marked around the rotary switch 90 of the display panel 101 can be controlled. The display panel 101 of the transparent display input device 100 is configured transparently, and allows images on the surface of the display, panel 101 to be changed. For instance, when the operator manipulates input switches 60 to select a menu, the image of the display panel 101 transforms into a display image appropriate for adjusting, controlling and operating certain functions. For example, a target temperature setting image is displayed around the center of the display panel 101 on the transparent display input device 100 in FIG. 5A. The target temperature may be controlled by the rotary switch 90. When the operator selects a switch with an air-conditioning function through the input switches 60, the image on the display panel 101 changes to show the target temperature setting image and control switch scales for setting the target temperature ranging, for example, from approximately 20° C. to approximately 30° C. are displayed as illustrated in FIG. 5A. Another example shows that when the operator selects a switch with an audio function through the input switches 60, the image on the display panel 101 transforms into scales displaying the volumes of the audio as illustrated in FIG. 5B. The volume of audio devices, such as CDs and MDs, can be controlled based on the changed scales. Accordingly, a single fixed switch can function as a multi-functioning switch applicable to a plurality of functions by: fixing the rotary switch 90 on the display panel 101; and displaying different scales appropriate for each function around the rotary switch 90 through operating the input switches 60. Also, the number of fixed switches to be installed on the display panel 101 can be reduced since there no longer exists a need for installing separate switches corresponding to each function. Although the application of only one fixed switch is described in this embodiment, a plurality of rotary switches 90 can be installed according to functional characteristics or the number of realizable functions. Also, according to the present embodiment, the operator can easily manipulate the vehicle display apparatus on a visibly large image because the display image for adjusting, controlling, and operating the corresponding function can be largely displayed on the display panel 101 when implementing certain functions according to the input switches 60.

Figure 6A:
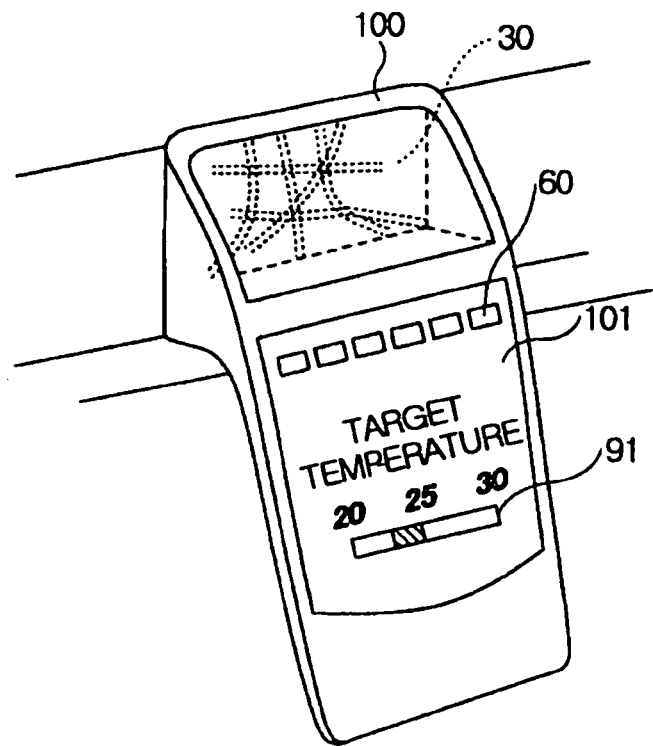
FIGS. 6A and 6B are schematic diagrams illustrating a vehicle display apparatus including a slide switch installed in a display panel of a transparent display input device 100 in accordance with the first embodiment of the present invention.
Figure 6B:
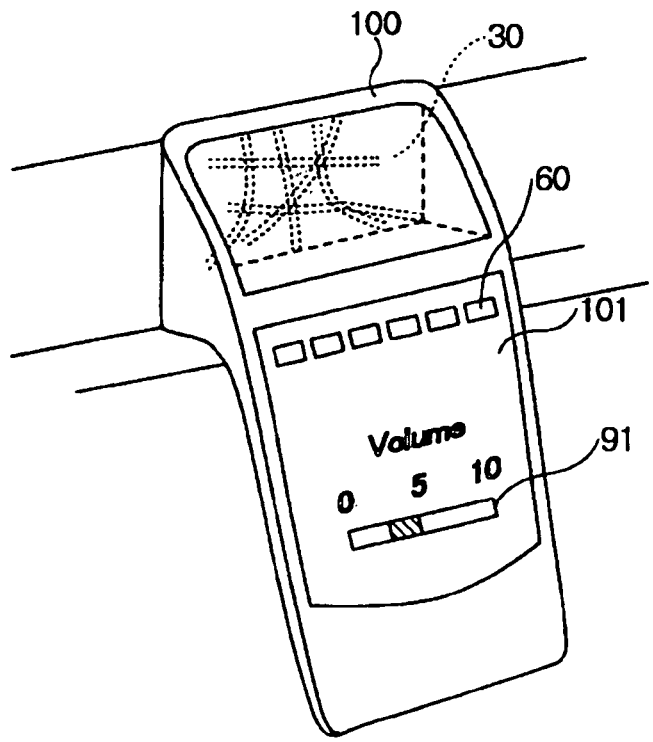

FIGS. 6A and 6B illustrate a vehicle display apparatus in accordance with the embodiment of the present invention, wherein the display apparatus further includes a slide switch 91 installed in a display panel 101 of a transparent display input device 100. The vehicle display apparatus shown in FIGS. 6A and 6B is substantially the same as the vehicle display apparatus shown in FIGS. 5A and 5B, except that the slide switch 91 is used instead of the rotary switch 90 in the vehicle display apparatus shown in FIGS. 6A and 6B. Displays on the display panel 101 perform appropriate displays according to certain functions in both embodiments shown in FIGS. 5A, 5B and 6A, 6B. It is different from the embodiment described in FIG. 5A, 5B that the scales in FIG. 6A, 6B are displayed in a horizontal row that is appropriate for the slide switch 91. Both the slide switch 91 in FIG. 6A, 6B and the rotary switch 90 in FIG. 5A, 5B function as a multi-functioning switch, change by the transformation of display images on the display panel 101 in response to the selection of the input switches 60, and are largely displayed on the display panel 101 for each function. The fixed multi-functioning switch in accordance with this embodiment can include any type of switch as long as the switch can display by transformations of adjusting scales, two-dimensionally. For instance, a lever type switch or a film type multi-directional switch used in cellular phones can be appropriately used.

Figure 7:
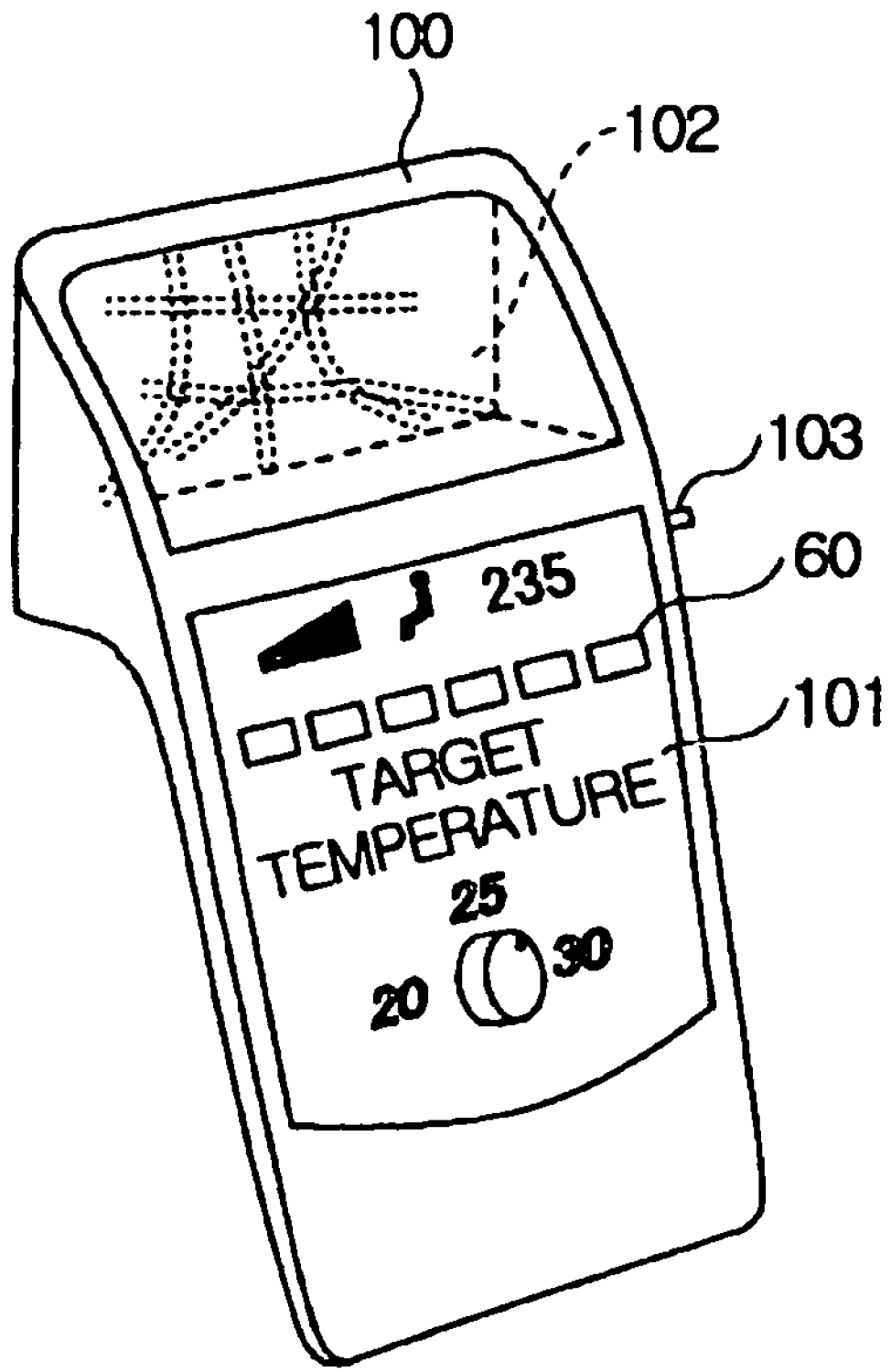
FIG. 7 is an exemplary diagram showing various functions appearing on the vehicle display apparatus in accordance with the first embodiment of the present invention.

FIG. 7 illustrates other various functions of the vehicle display apparatus in accordance with the embodiment of the present invention. In the vehicle display apparatus of the present embodiment, the image display device 30, of which the visibility is emphasized the most, is disposed in front at a long distance away from an operator, and the multi-functioning transparent display input device 100 is installed right next to the operator for remote controlling. However, although the transparent display input device 100 has many functions, the operator is not given an oppressed feeling because the transparent display input device 100 is transparent. Also, spaciousness can be created inside the vehicle. Examples of the various functions are described hereinafter.

For example, the transparent display input device 100 can not always display input switches 60 on a display panel 101, but an approach sensor 103 can be installed to allow displays on the corresponding display panel 101 to be actuated only when the hand of the operator approaches the display panel 101 as a hand approaching switch. Using the advantage of being transparent, the displays of the input switches 60 can be disappeared when not in use to make the entire panel transparent, effectively creating the spaciousness inside the vehicle.

Also, when an image display device 30 displaying important information such as an entire map is disposed at a angle of declination of approximately 15° from the operator, an enlarged view of a certain region of the map information at a bottom portion of an overlap displaying portion 102 of the transparent display input device 100, e.g., at a angle of declination of approximately 30°, can be displayed. That is, when heading toward a specific destination, the image display device 30 being the main display should be able to show where the vehicle is driving at a regular reduced scale at all times. Also, at the same time, the image display device 30 should show an enlarged display of the destination region on the transparent display input device 100. Other displays helpful for making decisions such as choosing a parking lot with easier access can be also displayed. By displaying the entire map of the image display device 30 and the enlarged regional map at positions where the two images relatively do not overlap with each other from the perspective of the operator by changing the angle of declination, the driver can select and view a desired map by altering the view point. Furthermore, the level of gas can be detected and gas station information can be displayed on the transparent display input device 100 when the detected gas is low. By displaying the information on the transparent display input device 100 within the angle of declination of approximately 30° and within a range of not interfering information displayed on the image display device 30, two different levels of information may be safely provided to the operator, and thus, more effective information can be provided.

Also, useful information such as the estimated time of arrival at the destination can be provided to the occupant in the front passenger seat by installing a occupant detecting sensor and having the displays of the transparent display input device 100 as a front passenger seat display when the occupant is in the front passenger seat.

A full dot type display can be employed as the display of the display panel 101 of the transparent display input device 100 to obtain vivid images for wider purposes. That is, the convenience of inputting can be improved by displaying enlarged images of the desired input switches 60, and the spaciousness inside the vehicle can be improved by controlling only the needed switches to be displayed and the transparent display to be relatively more transparent. Thus, a passenger may feel an improved comfort.

To make most of the characteristic of the transparent display panel 101, a different light source is used at nighttime, for example, the entire display panel 101 may be lit dimly using a blue LED. Also, letters and symbols displayed may be raised using an edge lighting to create a mysterious and beautiful space, improving comfort inside the vehicle. That is, occupants are provided with decorative effects of making the vehicle a pleasant space by creating the transparent and spacious atmosphere in the daytime and executing the decorative lighting functions in the nighttime.

Figure 8A:
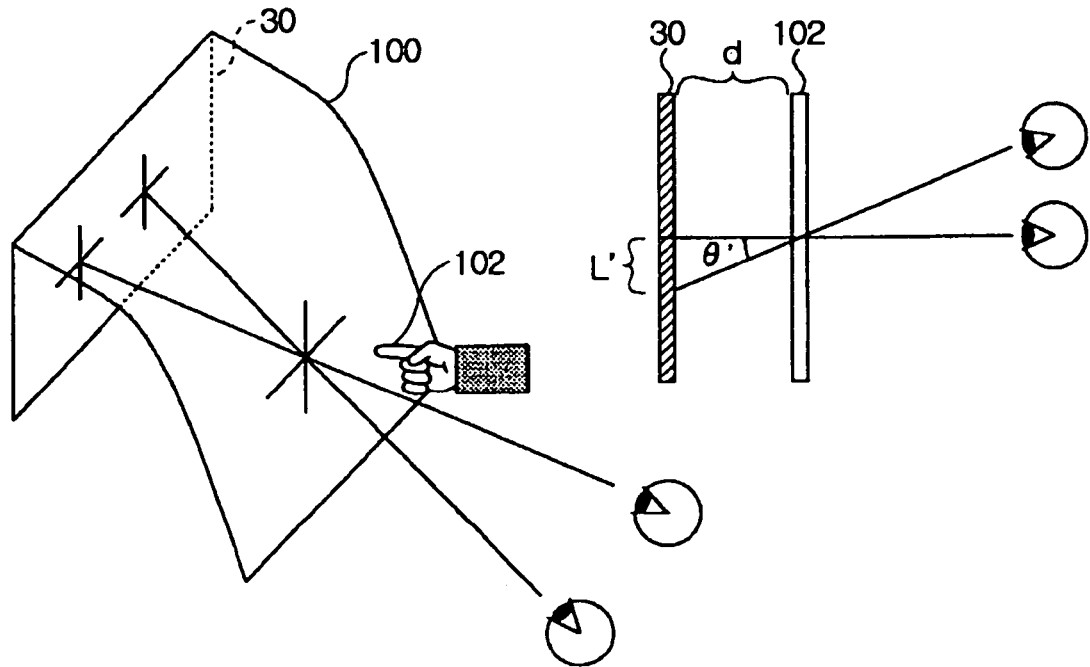
Figure 8B:
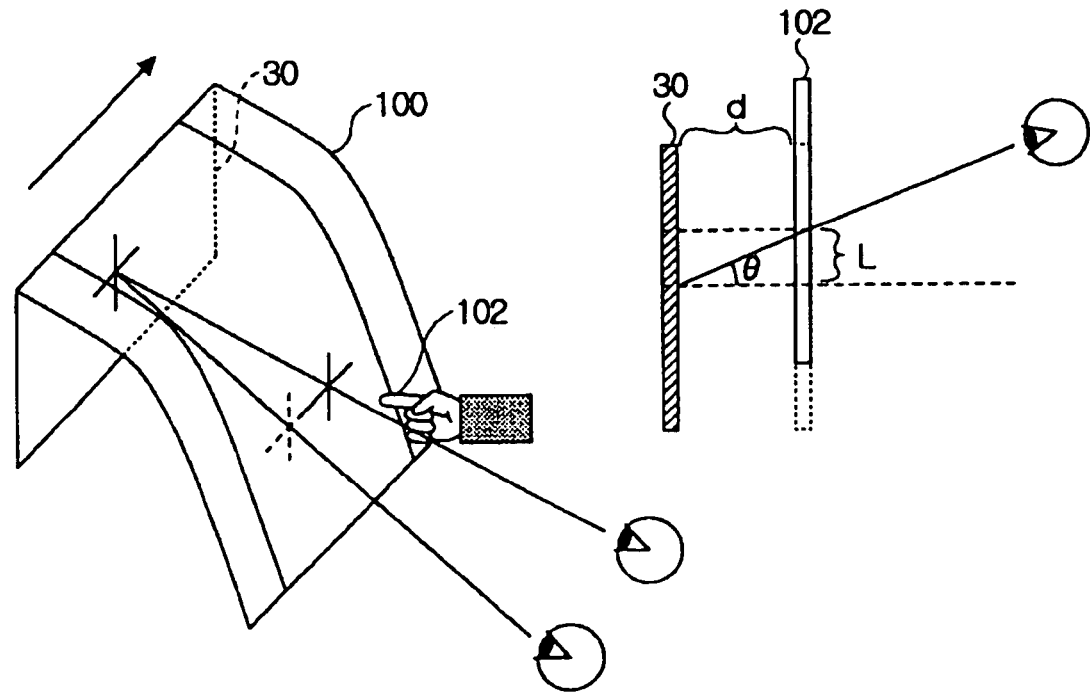

FIGS. 8A and 8B illustrate the concept of a vehicle display apparatus in accordance with a second embodiment of the present invention. Like reference numerals denote like elements described in the first embodiment of the present invention and, for the sake of convenience, descriptions for the like elements will be omitted. FIG. 8A illustrates the case of a parallax caused by the positional relationship of the eyes of an operator, a display of an image display device 30 and an overlap display portion 102 of a transparent display input device 100. A map is displayed on the image display device 30, and an operator wants to select a destination on the map. For instance, when the operator touches a transparent panel of the overlap display portion 102, a cross-shaped cursor is display on the overlap display portion 102 of the transparent display input device 100, and the operator scrolls through a map displayed on the image display device 30. By manipulating the cross-shaped cursor, the operator is able to select a certain region of the map. When the operator touches the transparent panel of the overlap display portion 102 again, a specific region of the map indicated by the cross-shaped cursor is selected. Particularly, FIG. 8A illustrates the case of selecting a central region of the map, and the cross-shaped cursor is displayed on a central region of the overlap display portion 102. When the operator views the map at a position nearly coinciding with the central regions of the image display device 30 and the overlap display portion 102, the cross-shaped cursor located at the central region of the overlap display portion 102 is positioned at the central region of the image display device 30. Thus, the operator is able to perceive the appointed position without an error. However, if the operator is at the side to the overlap display portion 102 and the image display device 30, and obliquely views the map and the cross-shaped cursor overlapped, the operator erroneously perceives the cross-shaped cursor to be located at a region away from the central region of the image display device 30 to a side region by a distance of L' due to a parallax. Therefore, even though the operator wants to select a region slanting to the left from the central region of the map, a region that is actually selected is likely to be at the center region of the map. According to the embodiment of the present invention, both the image display device 30 and the transparent display input device 100 are installed to be disposed around the center console 50 from the instrument panel 40 allocated at a central region of a driver seat and a front passenger seat. Thus, when the display apparatus according to the present embodiment is viewed from the driver seat and the front passenger seat, the operator obliquely views the image display device 30 and the transparent display input device 100. As a result, a parallax occurs due to a spacing distance d between the image display device 30 and the transparent display input device 100.

FIG. 8B illustrates the case of placing the overlap display portion 102 by a distance of L to curtail the error caused by the parallax. As FIG. 8B illustrates, an error distance due to the parallax can be defined by 'L=d tan θ', and thus, the parallax does not occur when the transparent display input device 100 is shifted to the operator's side by the error distance, i.e., the distance of L. In the present embodiment, a moving device shifts the transparent display input device 100 to the left of right side of the operator to reduce or eliminate the parallax. Also, the device preferably moves by the distance L=d tan θ as defined above. However, if the distance between the seats within the vehicle is already known and the error on the appointed region of the map is negligible, the device can be configured to move to the operator's side by a predetermined distance. For instance, the predetermined distance may range from approximately 5 mm to 100 mm, from approximately 20 mm to 80 mm, or from approximately 40 mm to 60 mm. More specifically, the moving device can be set to shift to the operator's side by approximately 50 mm.

Also, the present embodiment deals with the case of selecting a region of the map associated with the parallax occurring when the image display device 30 and the transparent display input device 100 are separated by a predetermined distance and the operator obliquely views the image display device 30 and the transparent display input device 100. However, the parallax may occur commonly for items displayed on the overlap display portion 102, and thus, the present embodiment can be applied to another display, i.e., the input switches 60.

Figure 9A:
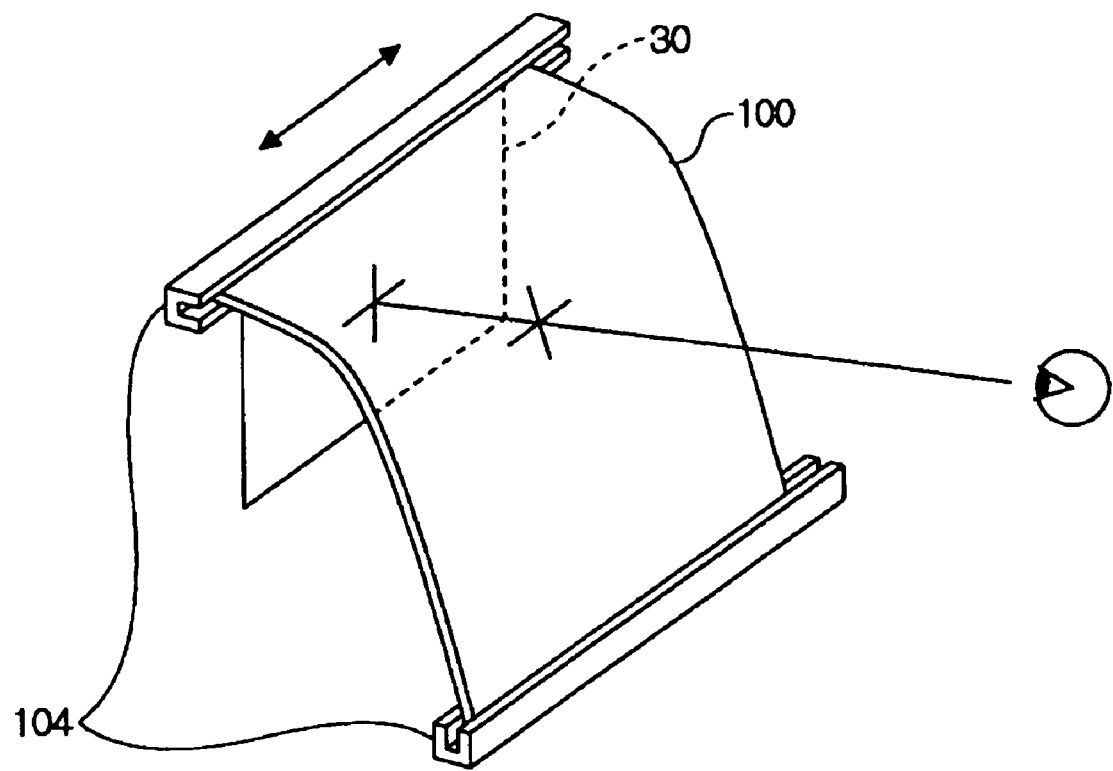
FIGS. 9A and 9B are schematic diagrams illustrating a vehicle display apparatus including a transparent display input device provided with sliding devices in accordance with the second embodiment of the present invention.
Figure 9B:
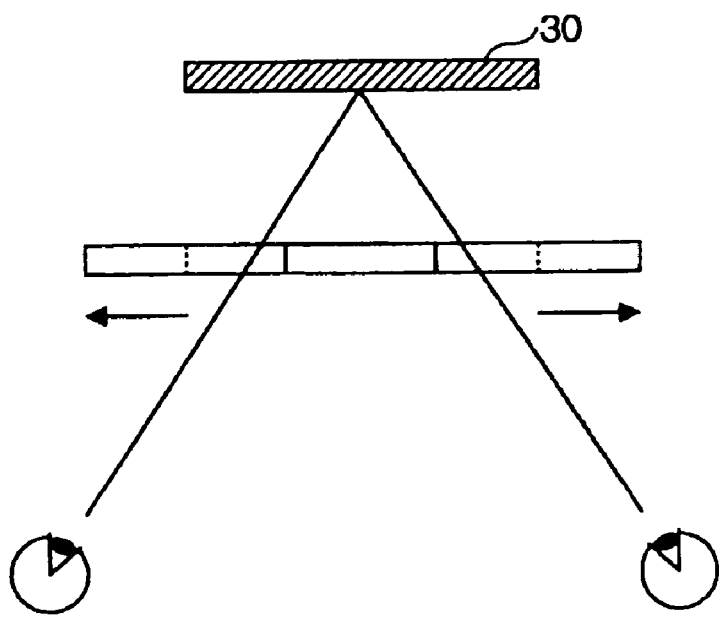

FIGS. 9A and 9B illustrate a vehicle display apparatus including a transparent display input device 100 provided with sliding devices in accordance with the embodiment of the present invention. Particularly, FIG. 9A illustrates a perspective view of the vehicle display apparatus. The sliding devices 104 supports the transparent display input device 100 by which an upper portion and a lower portion of the transparent display input device 100 are inserted individually into the corresponding sliding devices 104 in a rail type. The transparent display input device 100 is movable to the left and right side over the sliding devices 104. The sliding devices 104 can be configured to have wheels between the transparent display input device 100 and the corresponding rails of the eliding devices 104. Also, instead of the rail type, another type of rails that combines the transparent display input device 100 and the sliding devices 104 together through V-shaped grooves. Generally, any moving device that can move to the left and right side can be used. Furthermore, the sliding devices 104 can be operated manually by the operator, or equipped with a driving motor to move the transparent display input device 100 to an intended side using a switch.

FIG. 9B is a top view illustrating a positional relationship between elements of the display apparatus equipped with the sliding devices 104. If the operator is the driver, the transparent display input device 100 moves to the driver's side so that the parallax is reduced or eliminated when the driver views the image display device 30 through the transparent display input device 100. In contrast, if the operator is the front passenger, the transparent display input device 100 moves to the passenger's side to correct the parallax of the passenger. As an example of correcting the direction, once the operator sets the position of the transparent display input device 100 by manually moving the transparent display input device 100, and the same operator operates the transparent display input device, the operator sees an image in which the parallax is corrected. Thus, the manual operation of moving the transparent display input device 100 is allowed. Also, a sensor that detects the presence of, for example, a front passenger or a seat belt buckle switch may be provided to detect the presence of an occupant and determine whether the operator is the driver or the front passenger to decide the direction in which to shift the transparent display input device 100 based on the sensed signal.

A more accurate moving distance for the correction is observed when a coordinate point, corresponding to a selected region, of the overlap display portion 102 of the transparent display input device 100 is positioned on a connection line between the eyes of the operator and the selected region displayed on the screen of the image display device 30. The transparent display input device 100 can still be moved by a predetermined distance for the correction of the parallax since this approximately determined correction distance would give substantially the same correction effect. Thus, once the direction of moving the transparent display input device is determined, the transparent display input device can be moved to the determined side by a predetermined distance for the parallax correction.

Figure 10A:
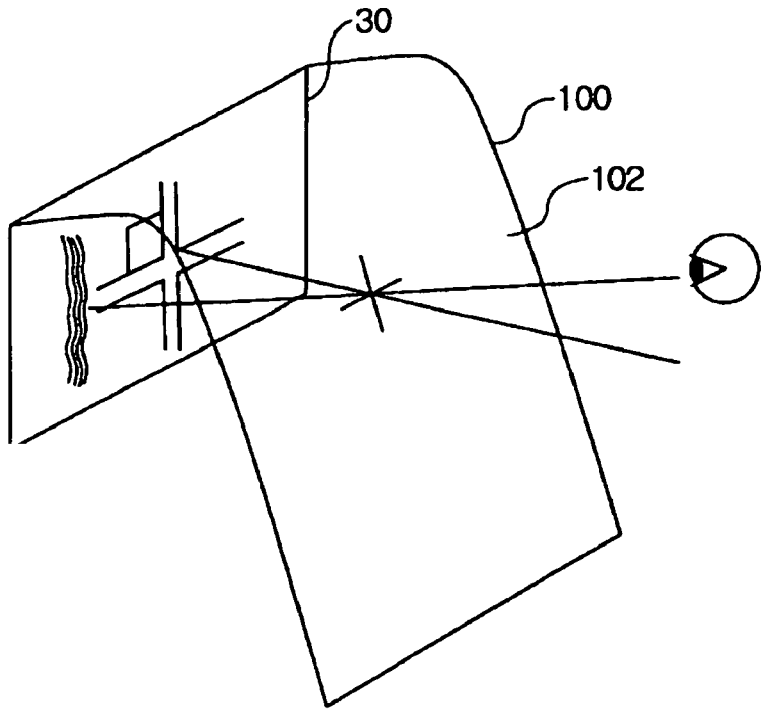
Figure 10B:
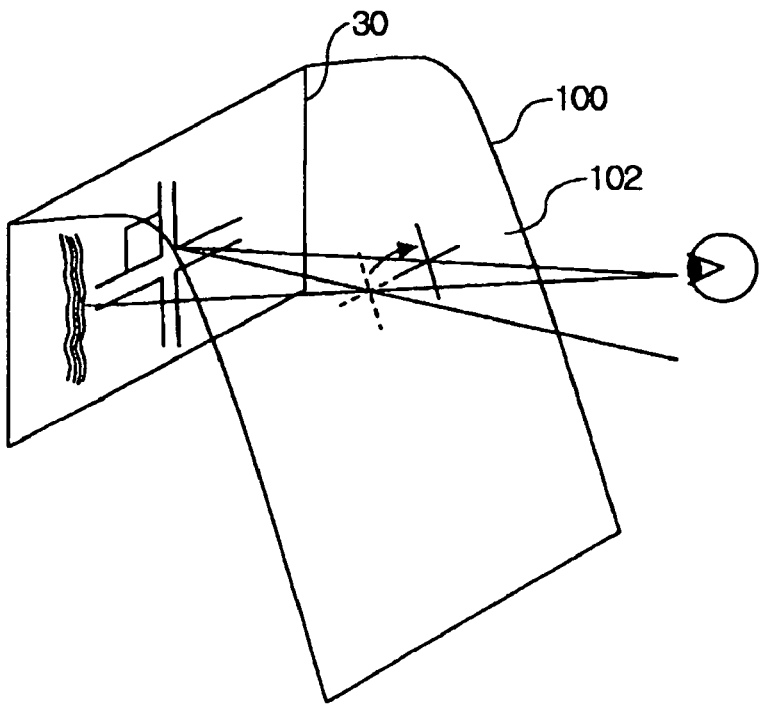

FIGS. 10A and 10B illustrate a vehicle display apparatus according to an embodiment of the present invention, wherein parallax correction is obtained by shifting the displayed image of a transparent display input device 100 to the left or right side.

FIG. 10A illustrates the case that an operator obliquely views a map displayed on an image display device 30 through the transparent display input device 100. For instance, the map shows an intersection at the center and a river on the left side. A cross-shaped cursor is displayed at the center of an overlap display portion 102 of the transparent display input device 100. When the map is viewed from the front, corresponding coordinates of the transparent display input device 100 are near the intersection at the center of the map. However, if the operator views the map from the driver's seat and obliquely views the cross-shaped cursor and the map overlapped, the operator perceives the cross-shaped cursor as indicating the river on the left side.

FIG. 10B illustrates the case that a cross-shaped cursor indicating an image displayed on the overlap display portion 102 is shifted to the driver's side in horizontal direction. Due to the movement of the cross-shaped cursor, the operator is able to perceive the cross-shaped cursor to mark the intersection at the center of the map, and thus, is able to accurately select the intended region of the map. Accordingly, the parallax can be corrected by shifting the displayed image of the transparent display input device 100 to the operator's side. As described in the above embodiments illustrated in FIGS. 8A, 8B and 9B, the accurate correction distance is corrected or adjusted based on the calculated coordinates, or the display image may be shifted to an intended side by a predetermined approximate distance.

Figure 11:
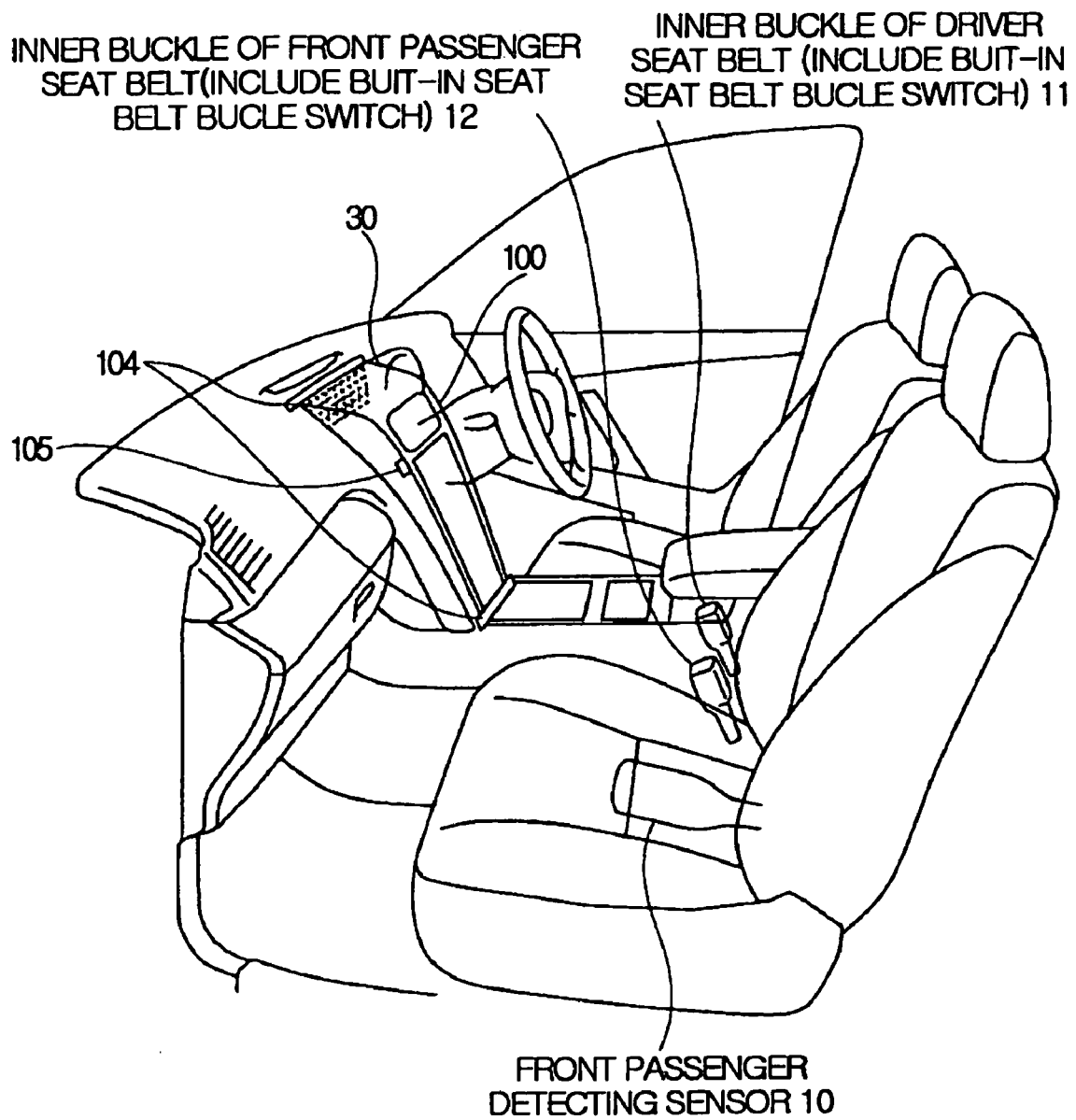
FIG. 11 illustrates a vehicle display apparatus including a moving device and an automatic operator determination device in accordance with the second embodiment of the present invention.

FIG. 11 illustrates a vehicle display apparatus including sliding devices 104 and an automatic operator determination device in accordance with another embodiment of the present invention. A passenger seat is installed with a front passenger-detecting sensor 10. Although not illustrated, a driver seat may be installed with a driver-detecting sensor. An inner buckle of a driver seat belt includes a built-in seat belt buckle switch 11, and similarly, an inner buckle of a front passenger seat belt includes another built-in seat belt buckle switch 12. Using the built-in seat belt buckles switches 11 and 12, the presence of a driver or front passenger can be determined. If an occupant sits on the front passenger or driver seat, the occupant is considered the operator of the display apparatus; thus, the transparent display input device 100 is shifted to the passenger's side over the sliding devices 104.

If occupants are detected in both the passenger and driver's seats, another device to determine the operator is necessary. In such as, case, the determination operation proceeds as follows. An infrared sensor 105 is provided on both sides of the transparent display input device 100. The infrared sensor 105 senses the movements of the hands of the two occupants, and determines the occupant who moves the hand as an operator. As an alternative to the infrared sensor 105, an ultrasonic wave-based approach sensor can be used to detect the approach of the hand and determine the occupant who moves the hand as an operator. Any type and form of the approach sensor that can detect the approach of the hand can be implemented to replace the infrared sensor 105. Also, when the operator touches the transparent display input device 100, a detection device, that determines the operator with a detection electrode placed in the seat side due to a negligible amount of current, may also be used. Using such sensors and detection devices, it is possible to determine whether the driver or the passenger is the operator. Thus, on the basis of this determination, the display apparatus can be configured to automatically move the transparent display input device 100 to the operator's side.

Figure 12:
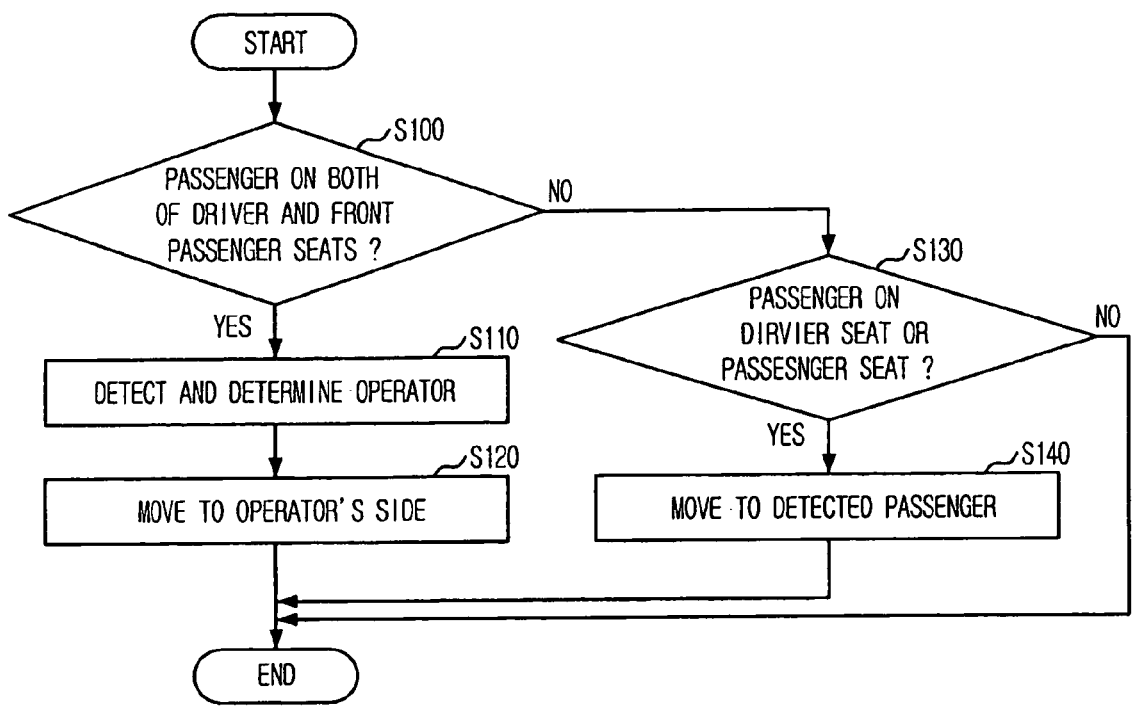
FIG. 12 is a flow chart describing a procedure of automatically moving the transparent display input device to the operator's side as shown in FIG. 11.

FIG. 12 illustrates a flow chart to describe a procedure of automatically moving the transparent display input device 100 to the operator's side in accordance with an embodiment of the present invention shown in FIG. 11.

At step S100, the presence or absence of a passenger on a driver or front passenger seat is determined. The passenger detecting sensor 10 and the seat belt buckle switches 11 and 12 can be used for the determination. When two occupants are detected sitting in the respective driver and front passenger seats, step S110 is carried out. Otherwise, the process carries out step S130.

In detail, at step S110, it is determined whether the driver or the front passenger is the operator using the infrared sensor 105, the approach sensor, or the detection device utilizing a negligible amount of current. At step S120, the transparent display input device 100 moves to the operator's side due to the sliding devices 104, and the procedure is terminated.

At step S130, it is determined on which seat the occupant sits. If the occupant sits on the front passenger seat or the driver seat, the front passenger is determined as the operator, and thus, the transparent display input device 100 moves to the operator's side at step S140, and the procedure is terminated. If no occupant is detected, the procedure is terminated. As described above, the sensor or detection device is installed to automatically determine whether a driver or a front passenger is an operator and move the display apparatus to the operator's side. As a result, the operator can see an image such as a map with improved visibility and a reduced burden of operating the corresponding apparatuses.

Figure 13A:
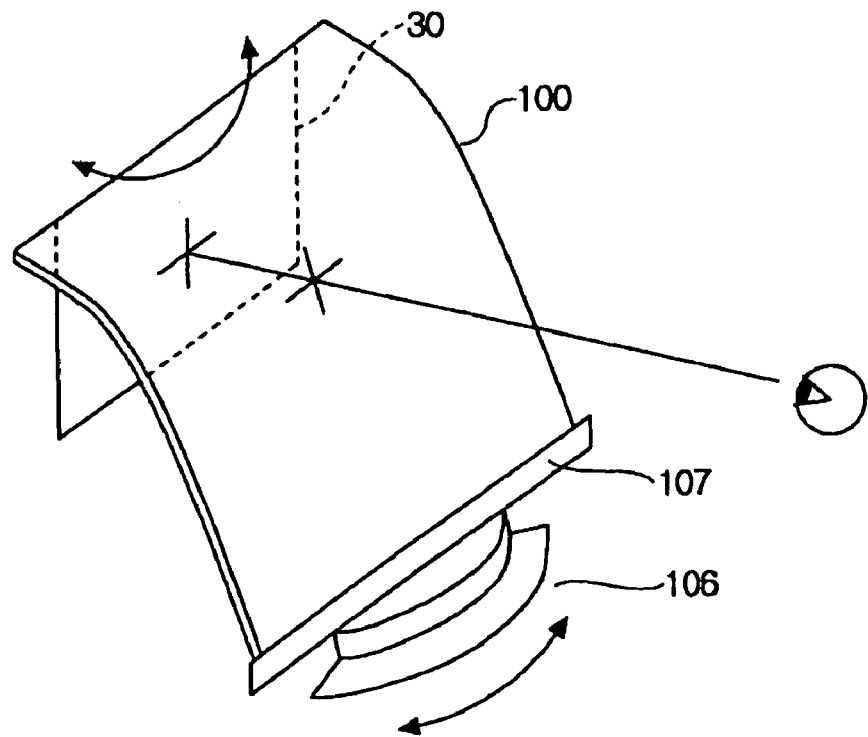
Figure 13B:
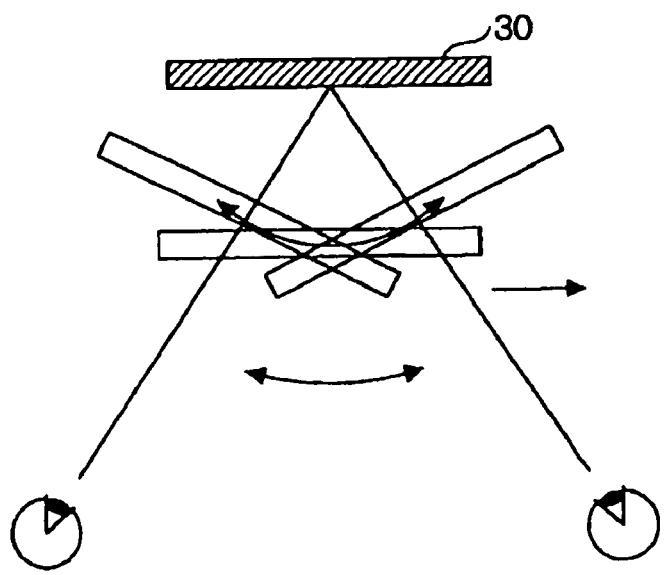

FIGS. 13A and 13B illustrate a vehicle display apparatus having a transparent display input device 100 provided with a rotating device 106 in accordance with the embodiment of the present invention. Particularly, FIG. 13A illustrates a perspective view of the rotating device 106. A supporting unit 107 of the rotating device 106 supports the lower portion of the transparent display input device 100. As similar to the known rotation of an electrical fan, the rotating device 106 rotates the transparent display input device 100 supported by the supporting unit 107 by an intended angle. Therefore, when an angle of the overlap display portion 102 of the transparent display input device 100 is set to face the operator's frontal field of view, the parallax from the operator can be reduced. Any types and forms of devices, that can support and rotate the transparent display input device 100, can be used as the rotating device 106. As like the sliding devices 104, the operator can set a direction of rotation by rotating the rotating device 106 manually, and can install a rotary driving device such as a motor and operate to which direction the rotating device 106 is to rotate using a switch of the rotary driving device.

FIG. 13B is a top view illustrating a positional relationship between elements of the display apparatus installed with the rotating device 106 in accordance with the present embodiment. In a normal mode where the operator is not determined, the transparent display input device 100 is disposed in parallel to the image display device 30 at a central region. If the operator is a driver on the right side, the rotating device 106 rotates the transparent display input device 100 to the right, i.e., to the driver's side. However, if the operator is a front passenger, the rotating device 106 rotates the transparent display input device 100 to the left, e.g., the front passenger's side. On the basis of the present embodiment, the transparent display input device 100 usually faces the front side of the operator during execution of correcting the parallax. Hence, the operator can see the overlap display portion 102 at the front side, resulting in improved visibility and high correction effect. To correct the parallax based on the horizontal movement of the transparent display input device 100 as described in FIGS. 9A and 9B, the operator still views obliquely the overlap display portion 102 even after the parallax correction. However, in the present embodiment, the operator can see the overlap display portion 102 around the front side; thus, the parallax correction can be enhanced to a great extent. Also, in the embodiment described in FIGS. 9A and 9B, there can be a chance of parallax in the central or edge regions of the display screen. However, in the present embodiment, a positional angle between the operator and the overlap display portion 102 is determined uniformly depending on how the operator and the overlap display portion 102 are positioned with each other. As a result, the parallax can be reduced in the central and edge regions of the display screen.

In addition, in the present embodiment described in FIGS. 13A and 13B, the occupant detecting sensor 10, the seat belt buckle switches 11 and 12, the approach sensor, or the detection device based on a negligible amount of current described in FIG. 11 can be used to determine whether a driver or a front passenger is an operator. After the determination of the operator using such a sensor or detection device, the transparent display input device 100 rotates automatically based on the determination result. Accordingly, the display apparatus according to the present embodiment can have improved visibility and operability/manipulability.

Figure 14A:
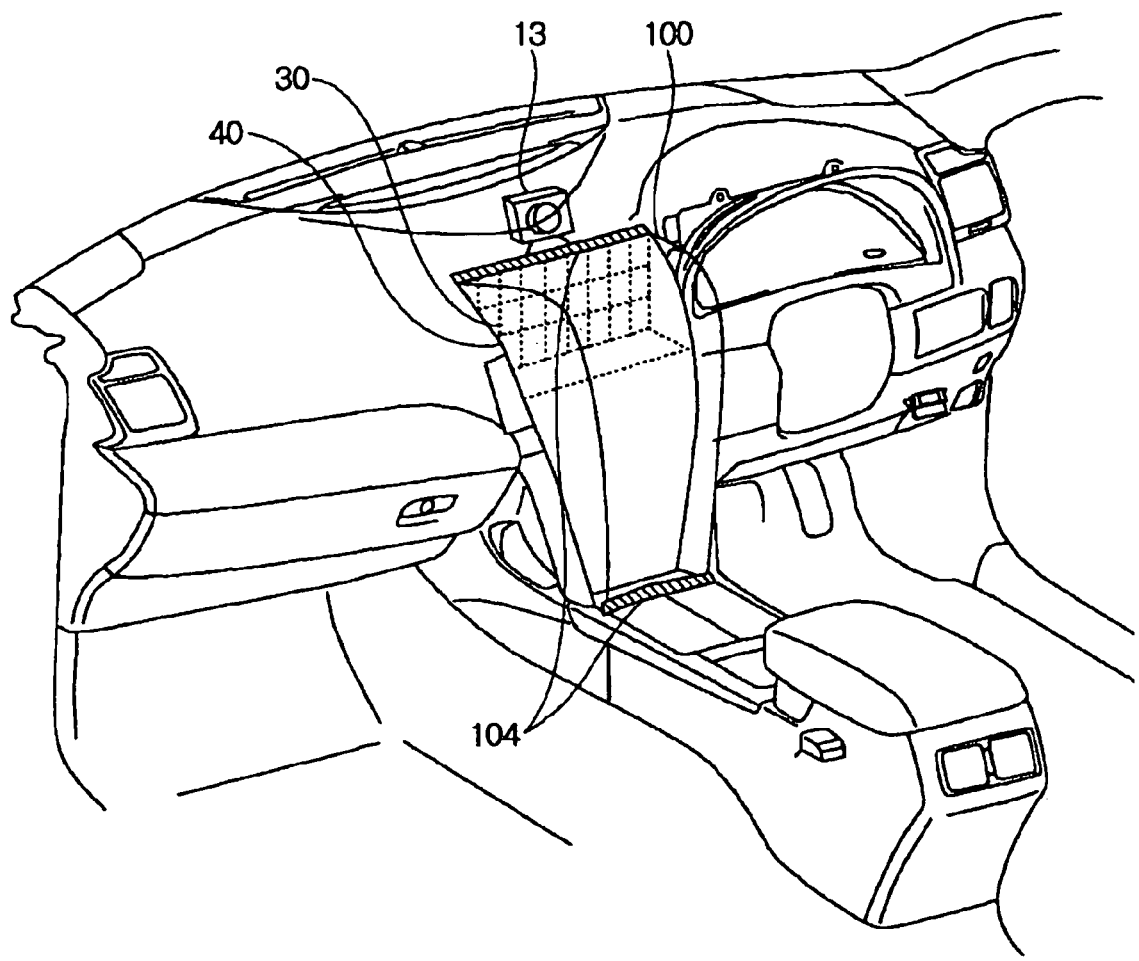
Figure 14B:
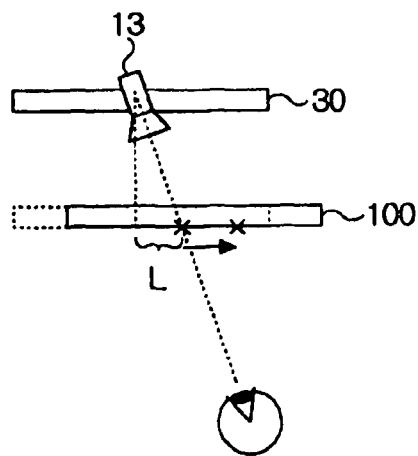
Figure 14C:
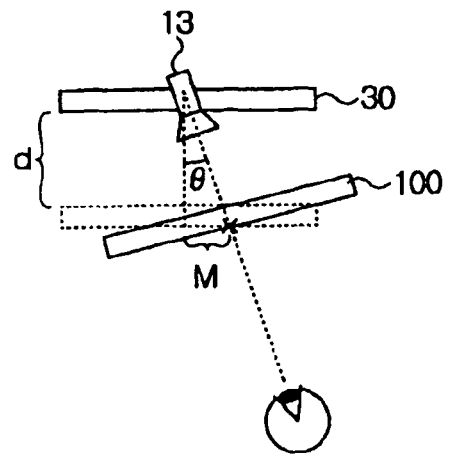

FIGS. 14A, 14B and 14C illustrate a vehicle display apparatus moving a transparent display input device 100 or the display image shown on the transparent display input device 100 in the right or the left direction based on automatic computation of a moving distance in accordance with the embodiment of the present invention. FIGS. 14A and 14B are a perspective view of the vehicle display apparatus and a top view of the same, respectively. As like the above-described embodiments, an image display device 30 is installed within an instrument panel 40, and the transparent display input device 100 is placed to cover the image display device 30 and the instrument panel 40. However, a television camera 13 is further installed in a central region of the instrument panel 40. The television camera 13 can rotate being placed over a rotary plate. The television camera 13 detects the location of the operator's eyes. In detail, the television camera 13 is beamed to the operator's eyes to determine the location of the eyes, and a point, where a connection line between the location of the eyes and the television camera 13 and the surface of the overlap display portion 102 of the transparent display input device 100 intersect with each other, is calculated. A horizontal distance L is measured from the above calculated intersection point and a point perpendicularly projected from the television camera 13 to the transparent display input device 100, and the horizontal distance L is the distance to move the transparent display input device 100 to the left or right side. The transparent display input device 100 moves to the left or right side by the calculated distance L using sliding devices 104. As similar to the embodiment described in FIG. 10, instead of moving the transparent display input device 100 by the calculated distance, a display image displayed on the transparent display input device 100 can be moved by the calculated distance L.

FIG. 14C illustrates a top view of a display apparatus including a rotating device 106 and a television camera 13. As similar to the above embodiment employing the slide device, the television camera 13 detects the location of the operator's eyes, and finds out a point where a connection line between the location of the operator's eyes and the television camera 13 intersects with the surface of the transparent display input device 100 disposed in horizontal direction. Assuming that M is the distance from this intersection point to a point perpendicularly projected from the television camera 13 to the transparent display input device 100, an accurate correction angle $\theta$ can be calculated from the relationship between the distance M and a distance d between the transparent display input device 100 and the image display device 30, which is defined as following: $M=d \tan \theta$, for the parallax correction. Also, the parallax can be corrected based on an approximate correction angle $\theta'$ that is calculated from the assumption that M is nearly equal to $d\theta'$ ($M \approx d\theta'$).

For the direction of the television camera 13, as similar to the embodiments described in FIGS. 11 and 12, it is determined whether a driver or a front passenger is an operator. Based on this determination, the direction to move the television camera 13 is determined, and afterwards, the above-described embodiment can be implemented. Also, the television camera 13 can capture wide-angle images. If the television camera 13 takes a picture of the driver and/or the front passenger in one screen, the location of the operator's eyes can be detected without changing the direction of the television camera 13. Although the present embodiment describes the placement of the television camera 13 on the upper side of the instrument panel 40, the television camera 13 may be placed in any position as long as an appropriate range of the correction by detecting the location of the operator's eyes can be calculated. For instance, the television camera 13 may be hung in the front ceiling region of the vehicle. Alternatively, the television camera 13 can be placed in any appropriate region of a driver or front passenger seat as long as the accurate correction is possible. According to the example embodiments of the present invention, the determination of an operator and an appropriate range of adjustment for correcting the parallax are automatically calculated and performed. Thus, it is possible to implement a user friendly display apparatus with improved visibility and operability/manipulability.

Although the correction to curtail parallax will be described only with respect to the left and right side or in horizontal direction, for easier understanding, parallax caused by differences in height between the operators may also occur in the vertical direction. If the display apparatus is configured to move vertically, the display apparatus may be implemented correct parallax that occurs in the vertical direction. For instance, sliding devices, that can move vertically, may be installed, or an image displayed on the transparent display input device 100 may be moved to an absolute coordinate system including up and down quadrants. A rotation device may include a device that is movable to a certain direction, and be installed within the display apparatus that can reduce or eliminate the up-down directional parallax. Correcting the up-down directional parallax greatly enhances visibility and operability/manipulability of the display apparatus as compared with the case of performing the left-right directional parallax. Therefore, the display apparatus may be implemented to correct parallax that may occur in the vertical direction.

Specific operation of the transparent display input device disposed right next to the operator improves the operability/manipulability of the image display device located at a distanced region, and creates spaciousness inside the vehicle.

While the present invention has been described with respect to certain preferred embodiments, it will be apparent to those skilled in the art that various changes and modifications may be made without departing from the spirit and scope of the invention as defined in the following claims.

The invention claimed is:

1. A vehicle display apparatus comprising:
   a display device to be disposed inside an instrument panel of a vehicle;
   a transparent display input device to be installed outside of the instrument panel to be located between the display device and a driver of the vehicle;
   a moving device that moves one of the transparent display input device and an image displayed on the transparent display input device up and down or left and right; and
   a detection device that detects one of a driver and a passenger as an operator, wherein the moving device moves one of the transparent display input device and the image displayed on the transparent display input device to the detected operator according to the detection result.

2. The vehicle display apparatus according to claim 1, wherein the moving device includes at least one of a sliding device for a straight movement and a rotating device for a circular movement to move the transparent display input device to up and down or left and right.

3. The vehicle display apparatus according to claim 1, further comprising a calculating device that calculates any distance that one of the transparent display input device and the image displayed on the transparent display input device moves from a previous position.

4. The vehicle display apparatus according to claim 1, further comprising:
   a sensor which is disposed near the transparent display input device and which senses an approach of an operator; and
   a display control device that controls the transparent display input device to display various functions on the transparent display input device when the approach of the operator is sensed.

5. The vehicle display apparatus according to claim 4, wherein when the operator does not operate the transparent display input device, the display control device controls the transparent display input device to display additional or detailed information related to a predetermined image displayed on the display device on a given region of the transparent display input device.

6. The vehicle display apparatus according to claim 1, further comprising lighting device that lights a display panel of the transparent display input device.

7. The vehicle display apparatus according to claim 1, further comprising a container or a storage space disposed in between a surface portion of the instrument panel and the back of the transparent display input device or between a surface portion of a center console and the back of the transparent display input device.

8. The vehicle display apparatus according to claim 1, further comprising a storage container to a rear of the transparent display input device, said storage container open on right and left sides of said transparent display input device.

9. The vehicle display apparatus according to claim 1, wherein the transparent display input device includes at least one of a rotary switch and a slide switch disposed on a surface of the transparent display input device, wherein the rotary switch and the slide switch are used for multiple functions, and wherein scales of the rotary switch or the slide switch are displayed differently in accordance with selected functions.

* * * * *